US011108917B2

(12) United States Patent
Sato

(10) Patent No.: US 11,108,917 B2
(45) Date of Patent: Aug. 31, 2021

(54) CORRECTION VALUE SETTING METHOD, RECORDING METHOD, AND RECORDING DEVICE USING PATCHES RECORDED IN DIFFERENT CONCENTRATION RANGES ALTERNATELY ARRANGED IN A DIRECTION INTERSECTING A NOZZLE ARRAY

(71) Applicant: SEIKO EPSON CORPORATION, Tokyo (JP)

(72) Inventor: Hiroki Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/931,502

(22) Filed: Jul. 17, 2020

(65) Prior Publication Data

US 2021/0021715 A1    Jan. 21, 2021

(30) Foreign Application Priority Data

Jul. 19, 2019  (JP) .............................. JP2019-133436

(51) Int. Cl.
*H04N 1/00* (2006.01)
*H04N 1/60* (2006.01)

(52) U.S. Cl.
CPC ..... *H04N 1/00031* (2013.01); *H04N 1/00015* (2013.01); *H04N 1/00045* (2013.01); *H04N 1/00087* (2013.01); *H04N 1/00819* (2013.01); *H04N 1/605* (2013.01)

(58) Field of Classification Search
CPC ........... H04N 1/00015; H04N 1/00031; H04N 1/00045; H04N 1/00087; H04N 1/00819
See application file for complete search history.

(56) References Cited

U.S. PATENT DOCUMENTS

| 2005/0185012 A1 | 8/2005 | Yoshida | |
| 2013/0106935 A1* | 5/2013 | Hoshii | H04N 1/4078 347/14 |
| 2013/0194327 A1* | 8/2013 | Hara | B41J 2/2128 347/7 |

FOREIGN PATENT DOCUMENTS

JP    2005-205691 A    8/2005

* cited by examiner

*Primary Examiner* — Scott A Rogers
(74) *Attorney, Agent, or Firm* — Global IP Counselors, LLP

(57) ABSTRACT

A correction value setting method includes a recording step of recording on a recording medium a test pattern including a plurality of patches by a plurality of nozzles arrayed in a first direction, a reading step of reading a concentration value of the test pattern recorded on the recording medium, a calculating step of calculating a correction value of an ink amount for each of the plurality of nozzles, based on the concentration value, and a setting step of setting the correction value as a correction value that is used for real recording. The plurality of patches include a plurality of first patches in a first concentration range and a plurality of second patches in a second concentration range including concentration higher than that in the first concentration range, and the plurality of first patches and the plurality of second patches are arranged alternately in a second direction intersecting the first direction.

9 Claims, 12 Drawing Sheets

CORRECTION VALUE SETTING METHOD, RECORDING METHOD, AND RECORDING DEVICE USING PATCHES RECORDED IN DIFFERENT CONCENTRATION RANGES ALTERNATELY ARRANGED IN A DIRECTION INTERSECTING A NOZZLE ARRAY

The present application is based on, and claims priority from JP Application Serial Number 2019-133436, filed Jul. 19, 2019, the disclosure of which is hereby incorporated by reference herein in its entirety.

BACKGROUND

1. Technical Field

The present disclosure relates to a correction value setting method, a recording method, and a recording device.

2. Related Art

JP-A-2005-205691 discloses a recording device in which a correction pattern is printed onto a medium by an ink-jet printer, a correction value is set for each raster line based on a reading result of the correction pattern, and dots of a corresponding raster line are formed to have a concentration level corrected based on the correction value during a dot formation operation.

When a correction test pattern in which an ink amount is sequentially increased and decreased is recorded on a recording medium that is highly ink-receptive, paper wrinkles are generated in a highly-concentrated region of the test pattern in some cases. Concentration unevenness caused by variation of ejection properties of nozzles of a printer cannot be read correctly from the test pattern having paper wrinkles. Thus, there is a problem in that an appropriate correction value for correcting concentration unevenness cannot be calculated.

SUMMARY

A correction value setting method includes a recording step of recording on a recording medium a test pattern including a plurality of patches by a plurality of nozzles arrayed in a first direction, a reading step of reading a concentration value of the test pattern recorded on the recording medium, a calculating step of calculating a correction value of an ink amount for each of the plurality of nozzles, based on the concentration value, and a setting setup of setting the correction value as a correction value that is used for real recording, wherein the plurality of patches include a plurality of first patches in a first concentration range and a plurality of second patches in a second concentration range including concentration higher than that in the first concentration range, and the plurality of first patches and the plurality of second patches are arranged alternately in a second direction intersecting the first direction.

In the correction value setting method described above, each of the first patches may include a plurality of first sub-patches having different degrees of concentration in the first concentration range.

In the correction value setting method described above, each of the second patches may include a plurality of second sub-patches having different degrees of concentration in the second concentration range.

In the correction value setting method described above, the plurality of first patches may be arranged such that concentration thereof gradually increase from one side to another side in the second direction, and the plurality of second patches may be arranged such that concentration thereof gradually increases from another side to the one side in the second direction.

In the correction value setting method described above, in the reading step, in the second direction an inner side in a region having a same concentration of each of the patches may be read.

In the correction value setting method described above, the plurality of first patches and the plurality of second patches may be separated away from one another.

In the correction value setting method described above, a width of each of the second patches in the second direction may be smaller than a width of each of the of first patches in the second direction.

A recording method includes a step of setting a correction value by executing the correction value setting method described above, a real recording data generating step of generating recording data for performing real recording, and a real recording step of performing real recording on a recording medium by a plurality of nozzles.

A recording device includes a correction value setting unit configured to set a correction value by executing the correction value setting method described above, a real recording data generation unit configured to generate recording data for performing real recording, and a recording unit configured to perform real recording on a recording medium by a plurality of nozzles.

DESCRIPTION OF EXEMPLARY EMBODIMENTS

1. Exemplary Embodiment 1-1. Schematic Configuration of Recording Device

Figure 1:
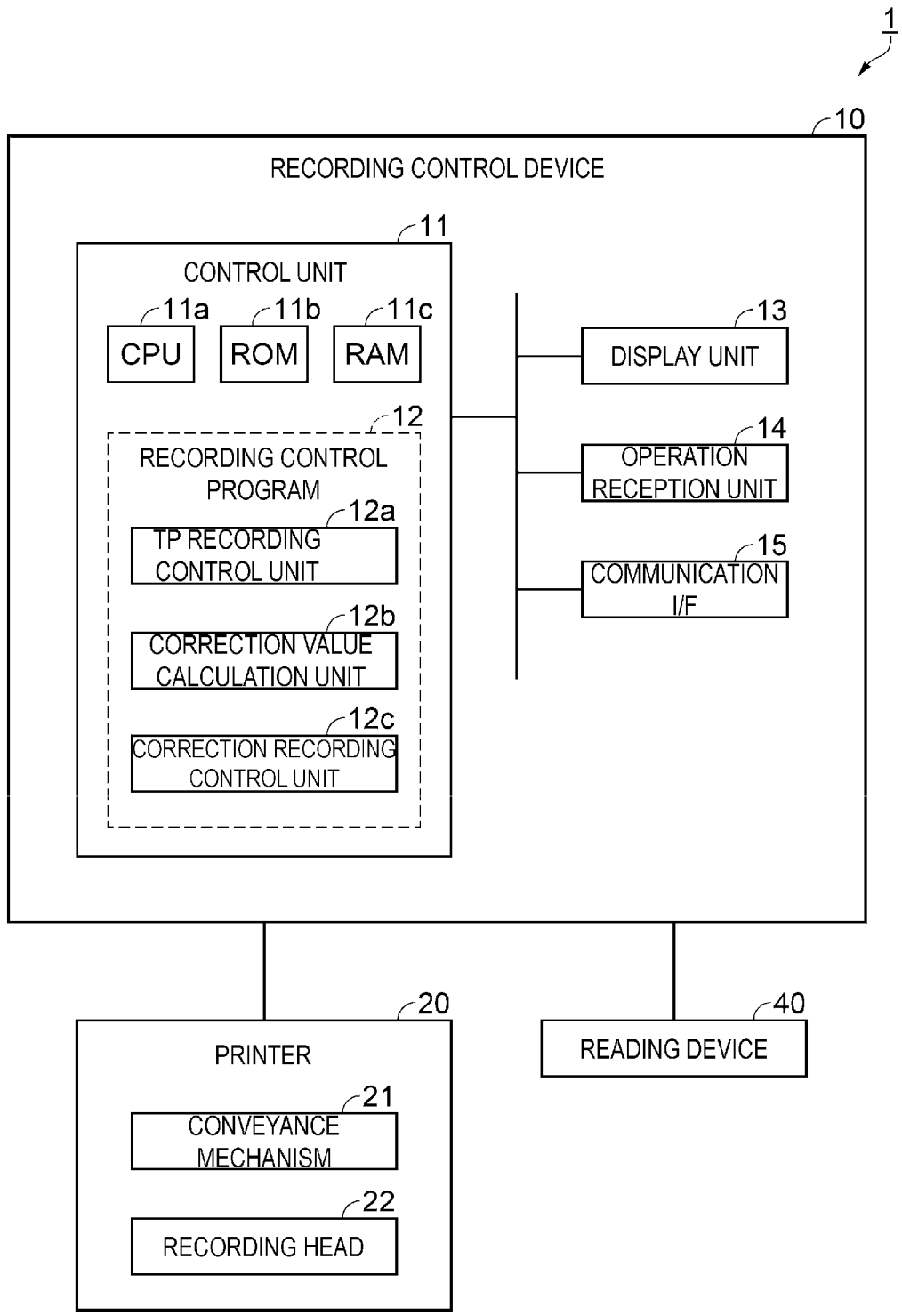
FIG. 1 is a block diagram illustrating a configuration of a recording device according to an exemplary embodiment in a simple manner.

FIG. 1 is a block diagram illustrating a configuration of a recording device according to an exemplary embodiment in a simple manner. A recording device 1 includes a recording control device 10 and a printer 20.

For example, the recording control device 10 is achieved by, a personal computer, a smartphone, a tablet-type terminal, or an information processing device having an equivalent processing capacity. The recording control device 10 includes a control unit 11, a display unit 13, an operation reception unit 14, a communication interface 15, and the like. The interface is denoted with I/F as an abbreviation. The control unit 11 includes one or a plurality of ICs including a CPU 11a as a processor, a ROM 11b, a RAM 11c, and the like, and other nonvolatile memories.

In the control unit 11, the CPU 11a executes computing processing in accordance with a program stored in the ROM 11b or other memories through use of the RAM 11c or the like as a work area. For example, the CPU 11a executes processing in accordance with a recording control program 12. With this, the control unit 11 achieves a plurality of functions such as a TP recording control unit 12a, a correction value calculation unit 12b, and the correction recording control unit 12c in collaboration with the recording control program 12. The test pattern is denoted with TP as an abbreviation. Note that the processor is not limited to one CPU. A configuration in which a plurality of CPUs and hardware circuits such as an ASIC execute processing may be adopted, or a configuration in which a CPU and a hardware circuit execute processing in collaboration may be adopted.

The display unit 13 is a means for displaying visual information, and is formed by a liquid crystal display and an organic EL display, for example. The display unit 13 may have a configuration including a display and a drive circuit that drives the display. The operation reception unit 14 is a means for receiving an operation of a user, and is achieved by physical buttons, a touch panel, a mouse, and a key board, for example. As a matter of course, a touch panel may be achieved as one of the functions of the display unit 13. The display unit 13 and the operation reception unit 14 can be collectively referred to as an operation panel of the recording control device 10.

The display unit 13 and the operation reception unit 14 may be parts of the configuration of the recording control device 10, or may be peripherals externally attached to the recording control device 10. The communication I/F 15 is a generic term for one or a plurality of I/Fs for the recording control device 10 to communicate with the outside via cables or wirelessly in conformity with a predetermined communication protocol including publicly known telecommunication standards. The control unit 11 communicates with the printer 20 and a reading device 40 via the communication I/F 15.

Figure 2:
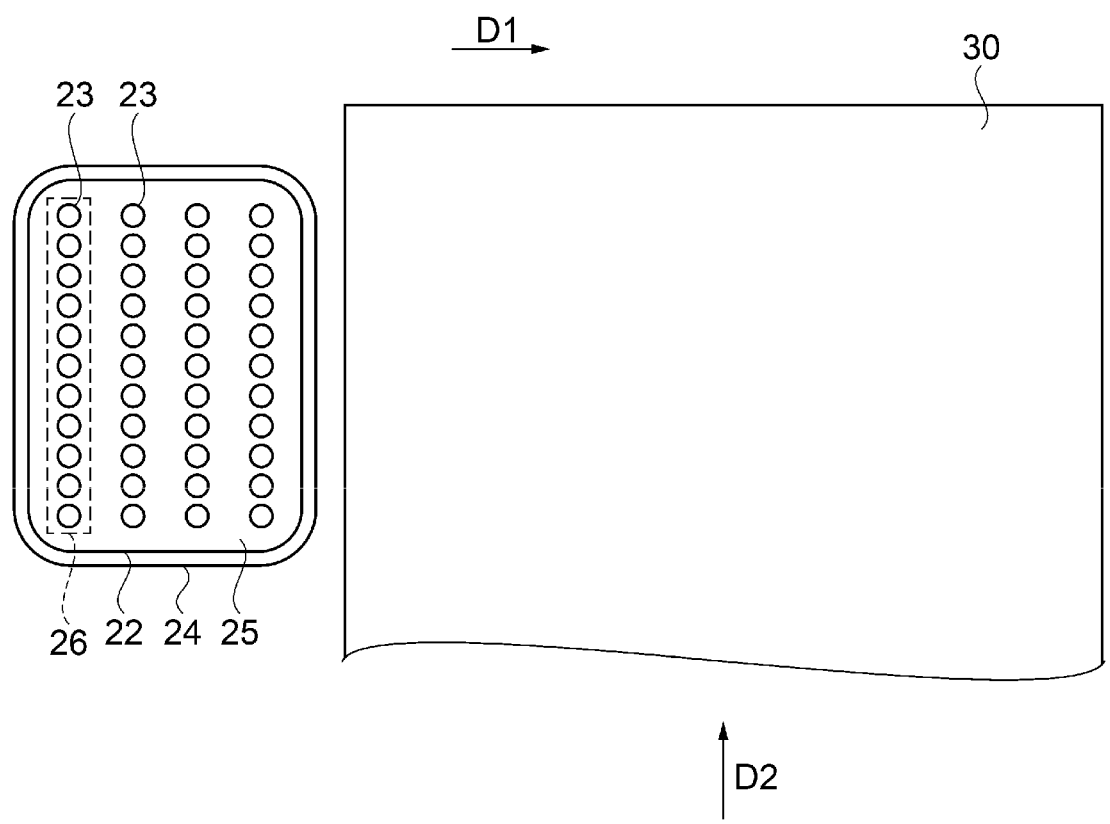
FIG. 2 is a diagram illustrating a positional relationship between a recording head and a recording medium in a simple manner.
Figure 3:
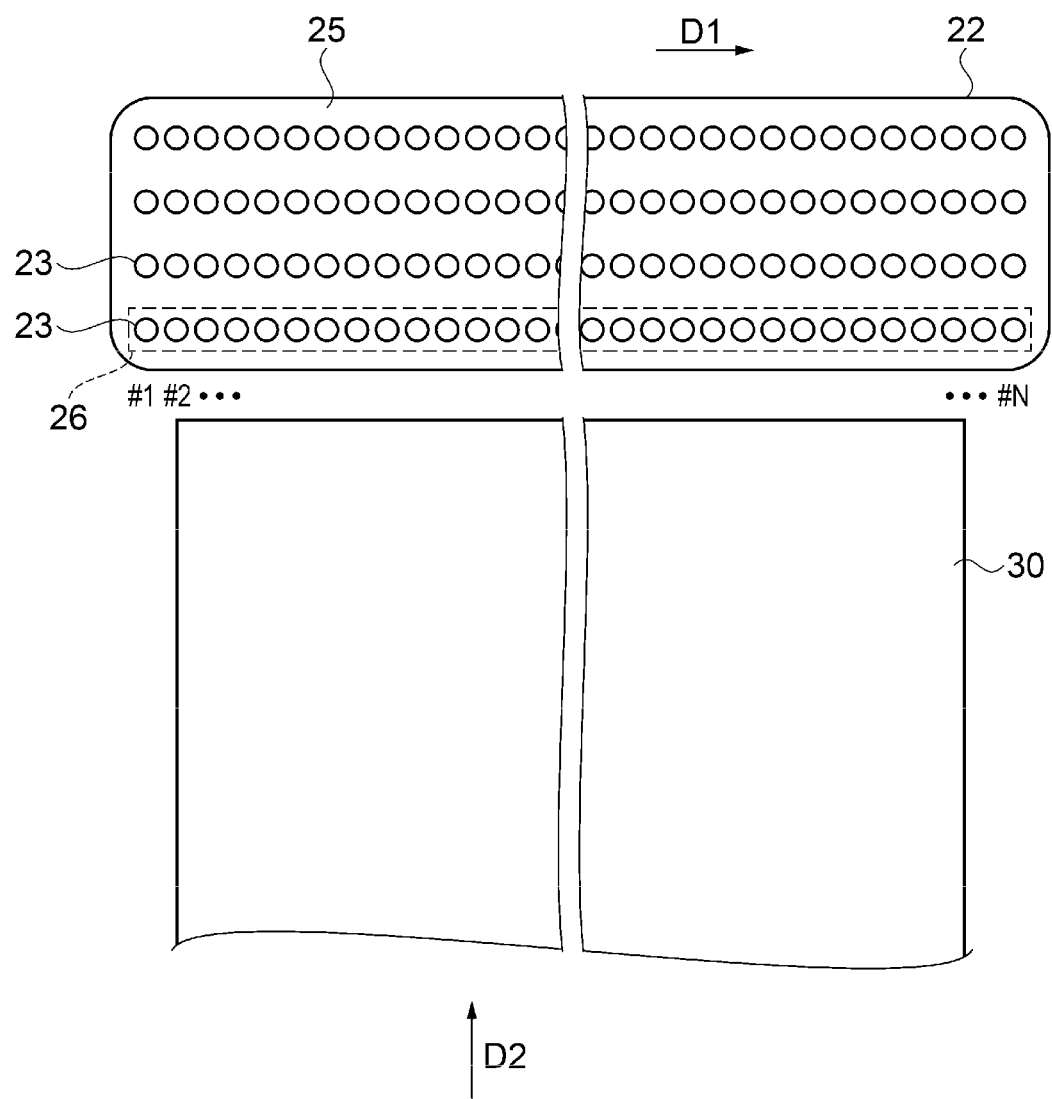
FIG. 3 is a diagram illustrating a positional relationship between the recording head and the recording medium in a simple manner.

The printer 20 controlled by the recording control device 10 is an ink-jet printer that perform recording by ejecting ink dots. The dots are also referred to as liquid droplets. Detailed description of the ink-jet printer is omitted, and the printer 20 schematically includes a conveyance mechanism 21, a recording head 22 as a recording unit, and the like. The conveyance mechanism 21 conveys a recording medium along a predetermined conveyance direction. As illustrated in FIG. 2 and FIG. 3, the recording head 22 includes a plurality of nozzle 23 capable ejecting dots, and causes the nozzles 23 to eject dots onto the recording medium 30 conveyed by the conveyance mechanism 21. The printer 20 controls application of a drive signal to drive elements (not shown) provided with the nozzles 23, in accordance with dot data described later. With this, the nozzles 23 can be caused to eject dots or can be prevented from ejecting dots. For example, the printer 20 performs printing by ejecting inks of colors including cyan (C), magenta (M), yellow (Y), and block (K), and inks or liquids of other colors. In the present exemplary embodiment, description is given while assuming that the printer 20 is a machine type of ejecting CMYK inks.

FIG. 2 is a diagram illustrating a positional relationship between the recording head 22 and the recording medium 30 in a simple manner. Typically, the recording medium 30 is paper. However, materials other than paper may be used as long as recording can be performed by ejecting liquids. The recording head 22 is mounted to a carriage 24 that is reciprocally movable along a predetermined direction D1, and moves along the carriage 24. The conveyance mechanism 21 conveys the recording medium 30 in a direction D2 intersecting the direction D1. The direction D2 indicates a conveyance direction. Intersection referred herein basically indicates orthogonal intersection. However, the directions D1 and D2 may not intersect each other orthogonally in a strict sense due to various dimensional errors in the printer 20, for example.

The recording head 22 includes a nozzle surface 25. In the nozzle surface 25, the nozzles 23 of the recording head 22 are opened. In FIG. 2, one example arrangement of the nozzles 23 on the nozzle surface 25 is illustrated. The recording head 22 includes nozzle rows 26 corresponding to the ink colors in a configuration in which an ink of each of the colors including CMYK is supplied from an ink holding means (not shown), which is referred to as an ink cartridge or an ink tank and is mounted to the printer 20, and is ejected from the nozzles 23. The nozzle row 26 is formed by the plurality of nozzles 23 having a constant nozzle pitch, which is an interval between the nozzles 23 arrayed in the direction D2 being a first direction. The recording head 22 includes four nozzle rows 26 corresponding to the CMYK inks, for example. It is needless to say that an arrangement mode of the plurality of nozzles 23 forming the nozzle row 26 corresponding to an ink of one color is not required be one having a linear shape as illustrated in FIG. 2 and FIG. 3. For example, the nozzles may be divided into a plurality of rows, or may be divided into a plurality of recording heads.

In the example of FIG. 2, conveyance of the recording medium 30 by the conveyance mechanism 21 by a predetermined conveyance amount and ink ejection performed by the recording head 22 along with movement of the carriage 24 are alternately repeated. With this, the printer 20 achieves recording onto the recording medium 30. In the example of FIG. 2, the printer 20 is a serial printer in which the recording head 22 mounted to the carriage 24 reciprocally moving along the direction D1 intersecting the direction D2 performs printing.

FIG. 3 is a diagram illustrating a positional relationship between the recording head 22 and the recording medium 30 in a simple manner. As illustrated FIG. 3, the printer 20 may be a line printer in which the recording head 22 that is oblong in the direction D1 intersecting the direction D2 performs printing.

With regard to FIG. 3, a difference from FIG. 2 is simply described. In the example of FIG. 3, the nozzle row 26 on the nozzle surface 25 is formed of the plurality of nozzles 23 arrayed in the direction D1 being a first direction at a constant nozzle pitch. The nozzle row 26 has a length equivalent to a width of the recording medium 30 in the direction D1, and the recording head 22 including the plurality of nozzle rows 26 corresponding to the ink colors is fixed without being mounted to the carriage. Further, in the example of FIG. 3, the printer 20 causes the recording head 22 to perform ink ejection onto the recording medium 30 being conveyed by the conveyance mechanism 21 at a predetermined speed in the direction D2 being a second direction intersecting the direction D1. In FIG. 3, nozzle numbers #1 to #N of the nozzles 23 forming the nozzle row 26 are indicated along the nozzle row 26.

Further, the recording control device 10 is communicably connected to the reading device 40. The reading device 40 is a generic term for a device that reads a concentration value of a TP recorded by the recording medium 30. For example, the reading device 40 may be a dedicated colorimeter, or may be a scanner or a camera that generates image data by optically reading a TP. The reading device 40 may be a part of the recording control device 10, or may be provided with the printer 20.

The recording control device 10 and the printer 20 may be connected via a network (not shown). The printer 20 may be a multifunction machine including a plurality of functions such as a function as a scanner and a facsimile communication function in addition to the printing function. The recording control device 10 may be achieved by a plurality of information processing devices that are communicably connected to each other via a network, as well as by one independent information processing device.

Alternatively, the recording control device 10 and the printer 20 may be an integrated device. Specifically, it may be understood that the recording control device 10 is a part of the configuration included in the printer 20 and that processing executed by the recording control device 10, which is described below, is processing executed by the printer 20.

1-2. Recording Method

Figure 4:
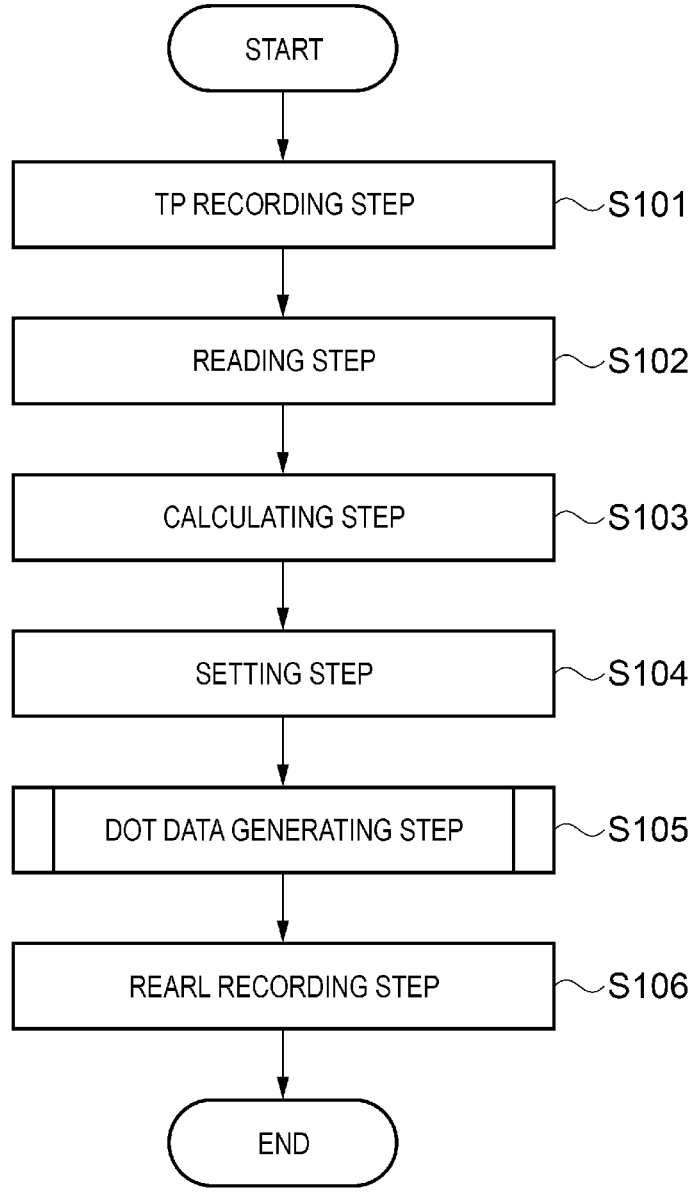
FIG. 4 is a flowchart illustrating a recording method including a correction value setting method.
Figure 5:
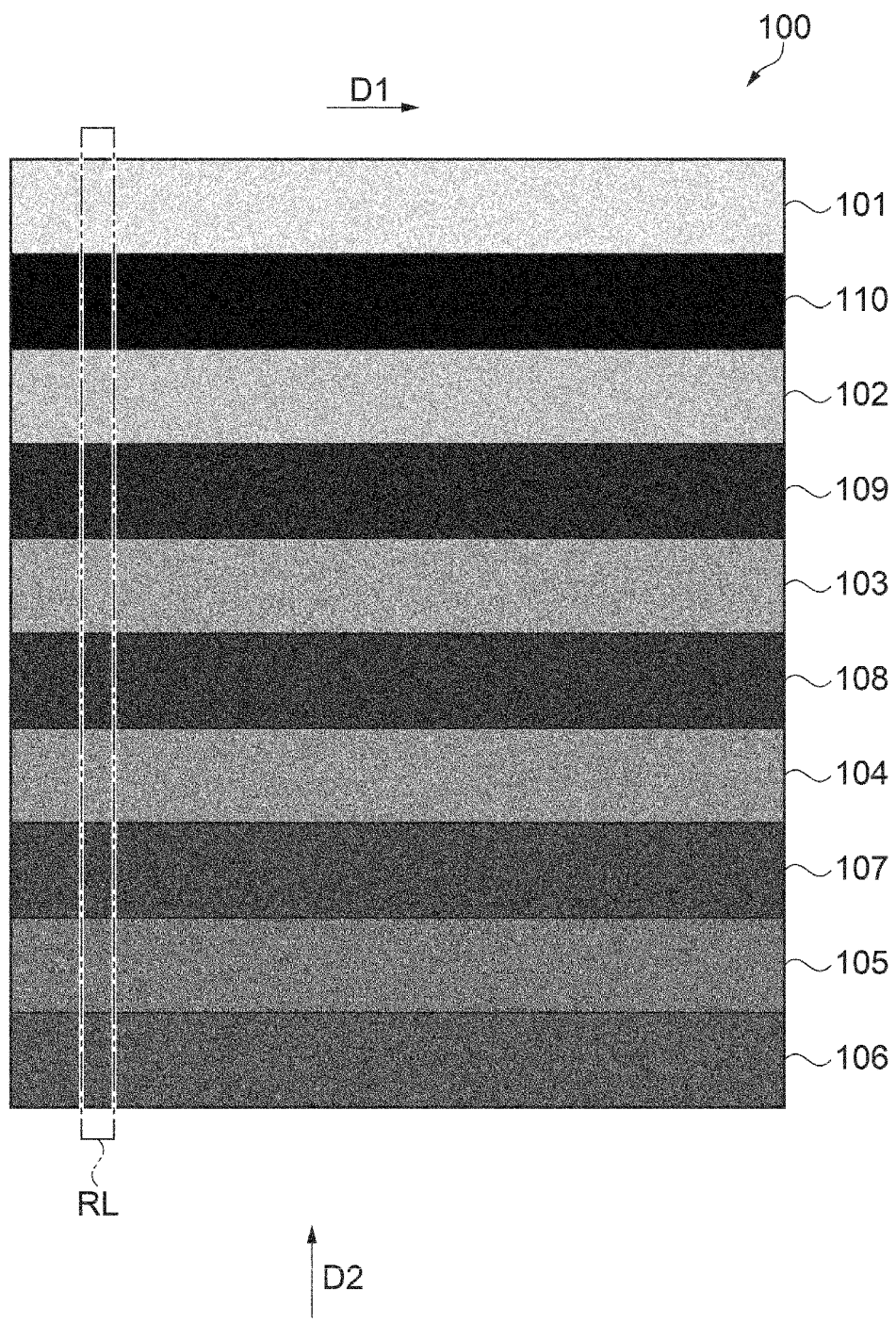
FIG. 5 is a diagram illustrating a test pattern recorded on the recording medium.
Figure 6:
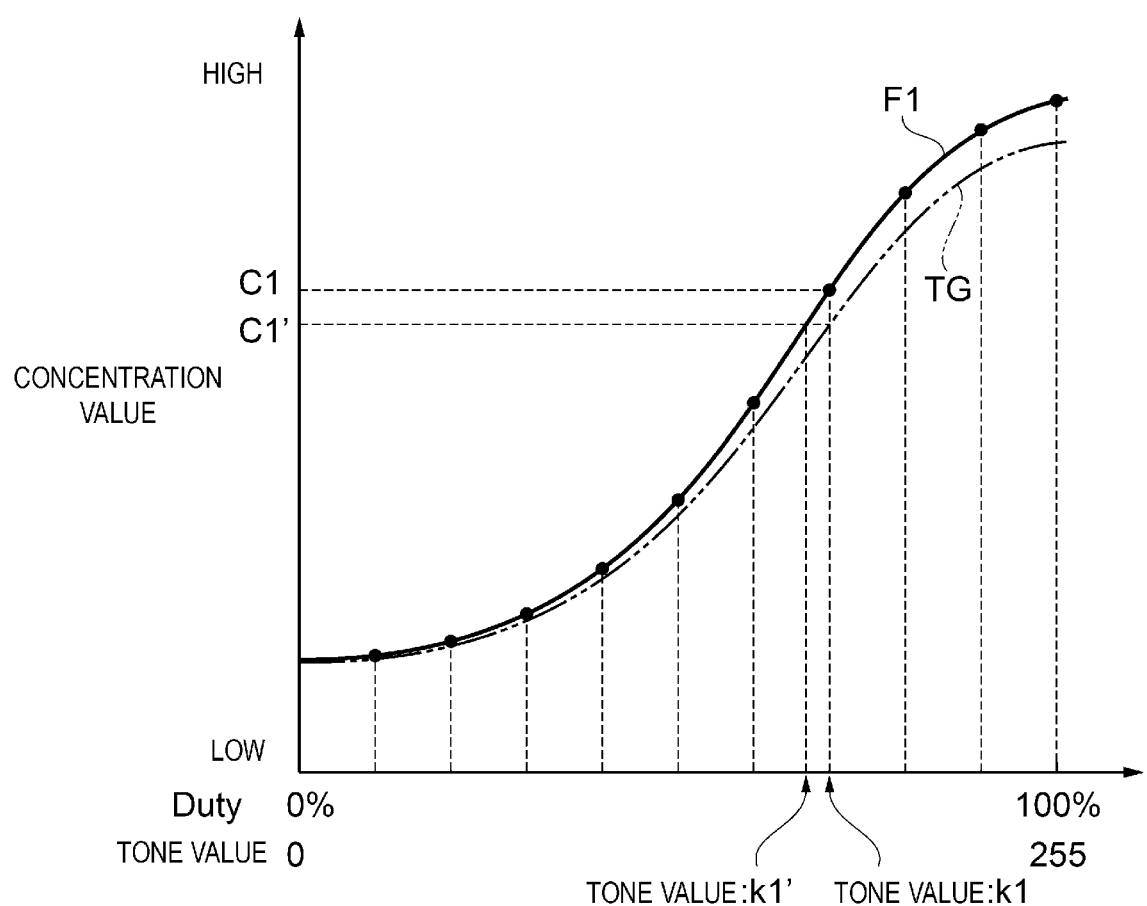
FIG. 6 is a graph showing a relationship between Duty and concentration.

FIG. 4 is a flowchart illustrating a recording method including a correction value setting method. FIG. 5 is a diagram illustrating a test pattern recorded on the recording medium. FIG. 6 is a graph showing a relationship between Duty and concentration. Note that the correction value setting method corresponds to Step S101 to Step S104 in the flowchart illustrated in FIG. 4. In the description for this recording method, it is assumed that the line printer illustrated in FIG. 3 is used. Further, in the description relating to the correction value setting method, for convenience, the correction value setting method in the nozzle row 26 corresponding to the K ink among the plurality of nozzle rows 26 is described.

Step S101 is a TP recording step in which a TP 100 including a plurality of patches 101 to 110 are recorded on the recording medium 30 by the nozzle row 26 formed by the plurality of nozzles 23 arrayed in the direction D1. The TP recording control unit 12a being a correction value setting unit causes the printer 20 to record the TP 100 including the plurality of patches 101 to 110. The patches 101 to 110 are concentration regions having different ink amounts used for recording. In the following description, the regions of the patches recorded on the recording medium 30 are referred to as "patch recording regions". The TP 100 including the plurality of concentration regions having different ink amounts is recorded on the recording medium 30. The patches 101 to 110 are regions recorded with an ink, and thus are referred to as "patch recording regions". TP data being image data expressing the TP 100 is prepared in advance in a predetermined memory or the like. The TP data is bit map data in which each pixel has a tone value indicating a K ink amount. The tone value is indicated with 256 tones from 0 to 255, for example. The TP recording control unit 12a subjects the TP data to halftone processing.

A specific method for the halftone processing is not particularly limited, and a dither method, an error diffusion method, and the like may be adopted. With the halftone processing, the dot data in which ejection or non-ejection of a dot of the K ink is defined for each pixel is generated. Note that, in the following description, ejection of a dot is also referred to as dot-on, and non-ejection of a dot is also referred to as dot-off.

The TP recording control unit 12a rearranges the generated dot data in the order of transmission to the printer 20. This rearranging processing is also referred to as rasterizing processing. With the rasterizing processing, a nozzle 23 from which an ink dot defined in the dot data is ejected and an ejection timing are determined in accordance with the pixel position. The TP recording control unit 12a transmits the dot data after the rasterizing processing to the printer 20. With this, the printer 20 performs recording of the TP 100 on the recording medium 30 based on the dot data transmitted from the recording control device 10.

As illustrated in FIG. 5, in the TP 100, the ten patches 101 to 110 each having a length equal to that of the nozzle row 26 in the direction D1 and a width in the direction D2 are arrayed in the direction D2.

The plurality of patches 101 to 110 includes a plurality of first patches 101 to 105 in a first concentration range and a plurality of second patches 106 to 110 in a second concentration range that is higher than the concentration of the first concentration range. In the present exemplary embodiment, the patches in the first concentration range indicate patches in which recording is performed with an ink amount that exceeds 0% but does not exceed 50% in a case where the TP 100 is recorded on the recording medium 30. In this case, it is assumed that an ink amount is 100% when an ink is ejected to all the pixels corresponding to a recording region of the patch. The patches in the second concentration range indicate patches in which recording is performed with an ink amount that exceeds 50% but does not exceed 100% in a case where the TP 100 is recorded on the recording medium 30. Note that the ink amount for the first concentration range and the ink amount for the second concentration range are merely examples, and are not limited thereto.

Specifically, the first patch 101 is a patch recorded with an ink amount of 10%. The first patch 102 is a patch recorded with an ink amount of 20%. The first patch 103 is a patch recorded with an ink amount of 30%. The first patch 104 is a patch recorded with an ink amount of 40%. The first patch 105 is a patch recorded with an ink amount of 50%.

The second patch 106 is a patch recorded with an ink amount of 60%. The second patch 107 is a patch recorded with an ink amount of 70%. The second patch 108 is a patch recorded with an ink amount of 80%. The second patch 109 is a patch recorded with an ink amount of 90%. The second patch 110 is a patch recorded with an ink amount of 100%.

Image data for each of the patches 101 to 110 is formed of pixels having the same tone value among the tone values from 0 to 255.

For example, the second patch 110 recorded with the ink amount of 100% is image data formed of pixels having the tone value of 255. From, the image data of the second patch 110, the dot data in which all the pixels are dot-on is generated, and an ink is ejected to all the pixels corresponding to the recording region of the second patch on the recording medium 30. With this, the second patch 110 is recorded on the recording medium 30. The second patch 110 in which an ink is ejected to all the pixels as described above is also referred to as a patch with an ink amount of 100% or a patch with Duty of 100%. In other words, the ink amount and Duty indicate a ratio of dot-on pixels in a recording region of a patch or a ratio of an ink-covered area in the patch recording region. The numeral value range from 0% to 100% of the ink amount and Duty can be normalized to the tone values from 0 to 255.

The first patches 101 to 105 are arranged concentration is higher, that is, the ink amount is increased from one side being a tip end of an arrow indicating the direction D2 to the other side being a base end of the arrow.

The second patches 106 to 110 are arranged concentration is higher, that is, the ink amount is increased from the other side being the base end of the arrow indicating the direction D2 to the one side being the top end of the arrow.

Further, the first patches 101 to 105 and the second patches 106 to 110 are arranged alternately to each other in the direction D2.

Specifically, in the TP 100, from the one side to the other side in the direction D2, the first patch 101 of the ink amount of 10%, the second patch 110 of the ink amount of 100%, the first patch 102 of the ink amount of 20%, the second patch 109 of the ink amount of 90%, the first patch 103 of the ink amount of 30%, the second patch 108 of the ink amount of 80%, the first patch 104 of the ink amount of 40%, the second patch 107 of the ink amount of 70%, the first patch 105 of the ink amount of 50%, and the second patch 106 of the ink amount of 60% are sequentially arranged. Note that the number of first patches and second patches included in the TP 100 and the increased/decreased amount of the ink are merely examples, and are not limited thereto.

The TP recording control unit 12a causes the printer 20 to record the TP 100 while each of the nozzles 23 of the nozzle row 26 of the recording head 22, which corresponds to the K ink, is oriented in directions of recording each of the patches 101 to 110. Specifically, the TP recording control unit 12a causes the TP 100 to be recorded on the recording medium 30 while a shorter direction of each of the patches 101 to 110 corresponds to the direction D2 and a longer direction of each of the patches 101 to 110 corresponds to the direction D1.

Regions indicated with the broken line in the TP 100 illustrate raster lines RL recorded on the recording medium 30. The raster lines RL are parts of the image, and are regions in which pixels recorded with a single nozzle 23 that ejects the K ink are arrayed along the direction D2. Specifically, in Step S101, the TP recording control unit 12a causes one raster line RL to be recorded with each of the nozzles 23 at different positions in the longer direction of the nozzle row 26. The TP 100 is recorded on the recording medium 30 while being formed of the plurality of raster lines RL arrayed in the direction D1.

Step S102 is a reading step for reading a concentration value of the TP 100 recorded on the recording medium 30 in Step S101. The reading device 40 reads each of the patches 101 to 110 in the TP 100 recorded on the recording medium 30, and the correction value calculation unit 12b being a correction value setting unit acquires a concentration value being a read result from the reading device 40. The reading device 40 reads an inner side of each of the patches 101 to 110 in the same concentration region in the direction D2. In other words, a patch boundary part where the ink easily blots to generate a mixed color is not read. A color system used by the correction value calculation unit 12b to acquire a concentration value is not particularly limited. For example, the correction value calculation unit 12b acquires a concentration value obtained from a color value indicated with L*, a*, and b* components in a CIE L*a*b* color space defined by the International Commission on Illumination, which is read by a colorimeter, or acquires a concentration value obtained from image data indicated with RGB components, which is read by a scanner or a camera.

Step S103 is a calculating step for calculating a correction value of the ink amount for each of the nozzles 23, based on the result acquired by reading the concentration value of the TP 100. FIG. 6 illustrates shows concentration values of the raster lines RL recorded by a target nozzle, among the concentration values acquired in Step S102. In FIG. 6, the vertical axis indicates the concentration value, and the horizontal axis indicates Duty from 0% to 100% and the tone values from 0 to 255. Ten black circles marked at an equal interval in the horizontal axis direction indicate the concentration values of the patches 101 to 110 of the TP 100 recorded on the recording medium 30. The concentration value indicated with the black circle is an average value of the concentration values for each of the patches 101 to 110 in the raster lines RL recorded by the single nozzle 23 of the nozzle row 26 of the recording head 22, which corresponds to the K ink. The target nozzle is the single nozzle 23. The solid line connecting the ten black circles is a function F1 generated by interpolation calculation, and it can be said that variation of the concentration values, which are reproduced by the target nozzle on the recording medium 30 in accordance with Duty from 0% to 100% of the K ink, is indicated.

The correction value calculation unit 12b calculates the correction values for the target nozzle. A function TG indicated with the two-dot chain line in FIG. 6 shows target values for calculating the correction values. For example, as the function TG, a function, which is generated by interpolation calculation using an average value of the concentration values for each of the patches 101 to 110 recorded by all the nozzles 23 of the nozzle row 26 corresponding to the K ink, may be adopted.

For example, a concentration value indicated by the function F1 correspondingly to Duty of 70% is a concentration C1, and a concentration value indicated by the function TG correspondingly to same Duty of 70% is a concentration C1'. In this case, the correction value calculation unit 12b regards Duty for acquiring the concentration C1' with the function F1 as Duty after correction for Duty of 70%. When a tone value within the 256 tone range, which corresponds to Duty of 70%, is "k1", and a tone value within the 256 tone range, which corresponds to Duty after the correction for Duty of 70%, is "k1'", the correction value calculation unit 12b regards k1'-k1 as a correction value for the tone value k1. For example, when k1=170 and k1'=165 are satisfied, "−5" is a correction value for the tone value k1. The correction value calculation unit 12b calculates correction values with all the 256 tone values from 0 to 255 through use of the function F1 and the function TG described above. For example, when the nozzle row 26 of the K ink is formed of N nozzles 23, the correction value calculation unit 12b calculates correction values with the 256 tone values while sequentially setting the N nozzles 23 as the target nozzle. Specifically, the correction value calculation unit 12b calculates N*256 correction values.

Step S104 is a setting step for setting the correction value as a correction value used at the time of real recording. The correction value calculation unit 12b generates a correction value table based on the correction values calculated in Step S103, and causes a predetermined memory of the recording control device 10 to store the correction value table.

Note that, for example, in a case of the recording device 1 including the recording head 22 that ejects the inks of four colors of CMYK as illustrated in FIG. 3, the correction value calculation unit 12b executes processing for calculating N*256 correction values for each ink color from Step S101 to Step S103.

Figure 7:
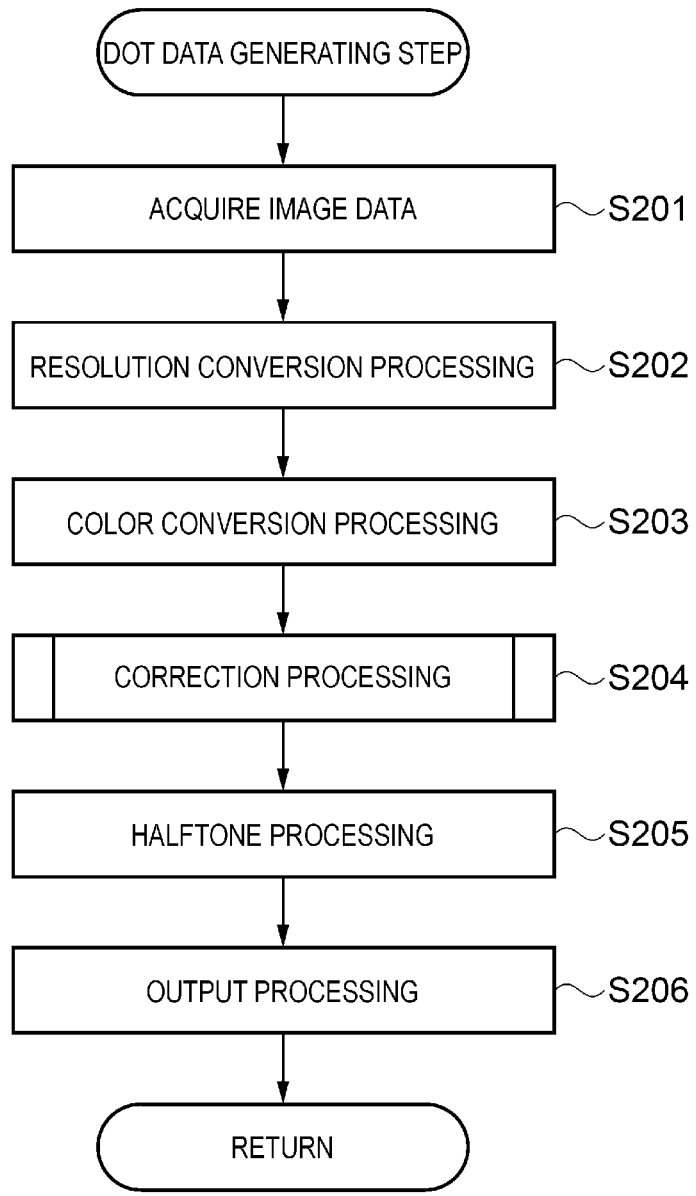
FIG. 7 is a flowchart illustrating processing executed in a dot data generating step.

Step S105 is a dot data generating step as a real recording data generation step for generating recording data for performing the real recording. FIG. 7 is a flowchart illustrating processing executed by the correction recording control unit 12c being a real recording data generation unit in the dot data generating step. With reference to the flowchart of FIG. 7, the dot data generating step in Step S105 is described in detail.

Step S201 is a step for acquiring image data to be recorded during the real recording. For example, a user operates the operation reception unit 14 while visually recognizing a user interface screen displayed on the display unit 13, and freely selects image data indicating an input image. The correction recording control unit 12c acquires the image data freely selected by the user from a predetermined input source.

Step S202 is resolution conversion processing for converting the image data acquired in Step S201 into a predetermined resolution. The correction recording control unit 12c converts the image data into image data in a bitmap file format having a printing resolution adopted by the printer 20. Each pixel data of the image data after the resolution conversion processing includes pixels arranged in a matrix pattern. Each pixel has a tone value in, for example, 256 tones in the RGB color space. Specifically, each piece of the pixel data after the resolution conversion indicates a tone value of the pixel corresponding to the resolution level at the time of printing onto the recording medium 30.

Step S203 is color conversion processing for converting the image data subjected to the resolution conversion processing into a color space of the inks used by the printer 20 for recording. When the image data expresses a color of each pixel with RGB by gradation as described above, the correction recording control unit 12c converts an RGB tone value for each pixel into a tone value for each of CMYK. The color conversion processing can be executed by referring to a freely-selected color conversion look-up table that defines a conversion relationship from RGB to CMYK.

Figure 8:
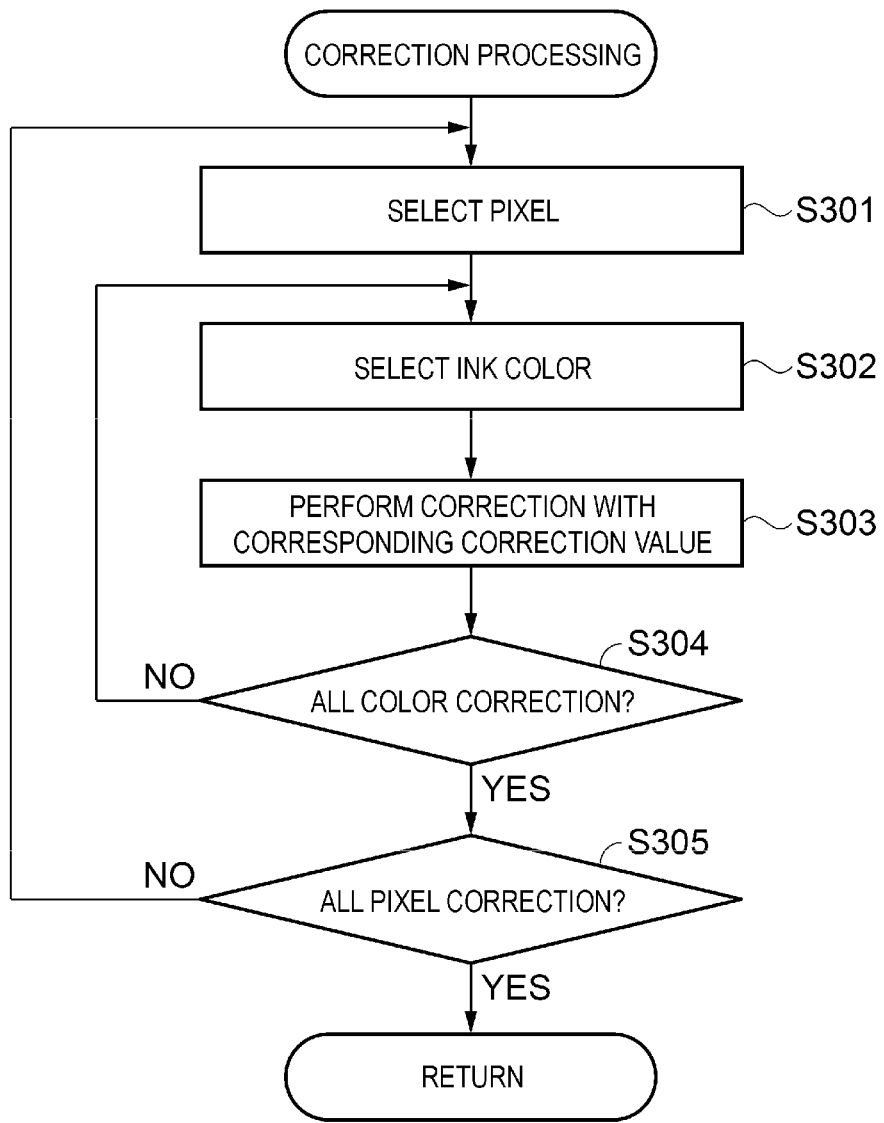
FIG. 8 is a flowchart illustrating processing executed in correction processing.

Step S204 is correction processing for correcting the image data subjected to the color conversion processing through use of the correction values stored in the correction value table. FIG. 8 is a flowchart illustrating processing executed in the correction processing. With reference to the flowchart of FIG. 8, the correction processing in Step S204 is described in detail.

In Step S301, the correction recording control unit 12c selects one pixel as a correction target from a plurality of pixels forming the image data.

In Step S302, the correction recording control unit 12c selects one tone value for an ink color being a correction target from tone values for each of CMYK that the pixel selected in Step S301 has.

In Step S303, the correction recording control unit 12c reads, from the correction value table, a correction value corresponding to the nozzle 23 to which the pixel selected in Step S301 is allocated and the ink color selected in Step S302, and corrects a tone value of the ink color selected in Step S302 with the read correction value. The correction recording control unit 12c specifies which nozzles 23 are allocated to the pixels forming the image data, based on a recording method adopted by the printer 20. For example, it is assumed that a pixel corresponding to the nozzle #1 is selected in Step S301 and that a tone value of the K ink that the pixel has, for example, a tone value of 50 is selected in Step S302. In this case, in Step S303, the correction recording control unit 12c reads, from the correction value table, a correction value for correction of the tone value of 50 corresponding to the K ink and the nozzle #1.

In Step S304, the correction recording control unit 12c determines whether correction in Step S303 is completed for the tone values of all the ink colors CMYK that the pixel selected in Step S301 has. When an ink color that is not subjected to the correction is present, the processing returns to Step S302, and a tone value for the uncorrected ink color is newly selected. Meanwhile, when the correction in Step S303 is completed for the tone values of all the ink colors CMYK, the processing proceeds to Step S305.

In Step S305, the correction recording control unit 12c determines whether correction is completed for all the pixels forming the image data. When a pixel that is not subjected to the concentration is present, the processing returns to Step S301, and an uncorrected pixel is selected. Meanwhile, when correction is completed for call the pixels, the correction processing in Step S204 is completed.

Step S205 is halftone processing for generating the dot data. the correction recording control unit 12c subjects the image data after the correction processing to the halftone processing, and generates the dot data.

Step S206 is output processing for causing the printer 20 to perform recording based on the generated dot data. The correction recording control unit 12c subjects the dot data to the rasterizing processing, and transmits the dot data after the rasterizing processing to the printer 20.

Step S106 is a real recording step for performing the real recording on the recording medium 30 with the plurality of nozzles 23. The printer 20 performs recording, on the recording medium 30, the input image based on the dot data transmitted from the recording control device 10.

In the description of the flowchart of the dot data generating step in FIG. 7, the target to be corrected with the correction value is the tone value of each ink color that the image data after the color conversion processing has. However, the target to be corrected with the correction value is not limited to such tone value. For example, the color conversion look-up table that is referred to at the time of the color conversion processing may be corrected. Specifically, the correction recording control unit 12c may correct a CMYK value after color conversion, which is defined in the color conversion look-up table, with a correction value for each color and each tone value. Further, in accordance with a correction value, the correction recording control unit 12c may increase or decrease a tone value of each RGB that each pixel of the image data before the color conversion processing has. In this case, the correction value calculated as described above is not applicable as it is to the RGB, but the correction value can indirectly correct the RGB through use of a predetermined coefficient or a calculation formula in accordance with a relationship between increase/decrease of the RGB and corresponding increase/decrease of the CMYK.

Further, in the present exemplary embodiment, description is made on the case where a correction value is calculated for each of the nozzles 23 and correction is performed for each of the nozzles 23, but the present exemplary embodiment is not limited thereto. For example, when a nozzle row corresponding to an ink of one color is formed of a plurality of divided sub-nozzle rows including a plurality of nozzles, a correction value for a sub-nozzle row unit may be calculated, and correction may be performed for the sub-nozzle row unit. For example, when a recording head is formed of a plurality of sub-recording heads, and a nozzle row corresponding to an ink of one color is formed in the plurality of divided sub-recording heads, a correction value for a sub-recording head unit may be calculated, and correction may be performed for the sub-recording head unit.

The correction value setting method and the recording method of the line printer are described above. In a case of the line printer, the shorter direction of each of the patches 101 to 110 corresponds to the direction D2, and the longer direction of each of the patches 101 to 110 corresponds to the direction D1. The description is made on the case where the TP 100 is recorded on the recording medium 30 in this orientation. In contrast, in a case of a serial printer, the shorter direction of each of the patches 101 to 110 corresponds to the direction D1, the longer direction of each of the patches 101 to 110 corresponds to the direction D2. The TP 100 is required to be recorded on the recording medium 30 in this orientation.

As described above, with the correction value setting method, the recording method, and the recording device according to the present exemplary embodiment, the following effects can be achieved.

The correction value setting method uses the test pattern 100 in which the first patches 101 to 105 in the first concentration range, which are recorded with the ink amounts from 10% to 50%, and the second patches 106 to 110 in the second concentration range, which are recorded with the ink amounts from 60% to 100%, are alternately arranged in the direction D2. In this case of the test pattern 100, for example, the first patch 101 and the second patch 110 are adjacent to each other. In a case of the related-art test pattern in which arrangement is made to have the ink amounts that are sequentially reduced, the patch with the ink amount of 100% and the patch with the ink amount of 90% are adjacent to each other. The ink amount of the region formed of the two patches including the first patch 101 and the second patch 110 is less than the ink amount of the region formed of the two patches including the patch with the ink amount of 100% and the patch with the ink amount of 90% in the related-art test pattern, and hence paper wrinkles are less likely to be formed on the recording medium 30. With this, reading accuracy of the test pattern 100 recorded on the recording medium 30 can be improved, and an appropriate correction value can be calculated. Therefore, the correction value setting method that improves recording quality can be provided.

In the test pattern 100, the first patches 101 to 105 are arranged while the ink amounts are reduced as approaching the other side from the one side of the direction D2, and the second patches 106 to 110 are arranged while the ink amounts are increased as approaching the one side from the other side of the direction D2. For example, the first patch 105 with the largest ink amount in the first concentration range and the second patch 106 with the smallest ink amount in the second concentration range are arranged adjacent to each other. Further, the first patch 101 with the smallest ink amount in the first concentration range and the second patch 110 with the largest ink amount in the second concentration range are arranged adjacent to each other. With this, the ink amount distribution on the test pattern 100 recorded on the recording medium 30 is leveled, and paper wrinkles are less likely to be formed on the recording medium. Thus, reading accuracy for the test pattern can be improved, and an appropriate correction value can be calculated.

The reading device 40 reads concentration of the inner side in the region with the same ink amount each of the patches 101 to 110 in the direction D2. Specifically, the reading device 40 does not read the patch boundary part where the ink easily blots to generate a mixed color, and hence accuracy of reading the patches 101 to 110 can be improved.

The recording method includes a step for setting the correction value by performing the correction value setting method, the real recording data generating step for generating the recording data for performing the real recording, and the real recording step for performing the real recording on the recording medium 30 with the plurality of nozzles 23. In the step for setting the correction value, an appropriate correction value is calculated, and hence the recording method that improves recording quality can be provided.

The recording device 1 includes the TP recording control unit 12a and the correction value calculation unit 12b being a correction value setting unit that sets the correction value by executing the correction value setting method, the correction recording control unit 12c being a real recording data generation unit that generates the recording data for performing the real recording, and the recording head 22 being a recording unit that performs the real recording on the recording medium 30 with the plurality of nozzles 23. The TP recording control unit 12a and the correction value calculation unit 12b calculate an appropriate correction value, and hence the recording device 1 that improves recording quality can be provided.

2. Modified Examples

Now, modification examples of the test pattern recorded in the TP recording step are described. Note that, the same constituents as those in the exemplary embodiment are given the same reference signs, and redundant description of these constituents will be omitted.

2-1. Modification Example 1

Figure 9:
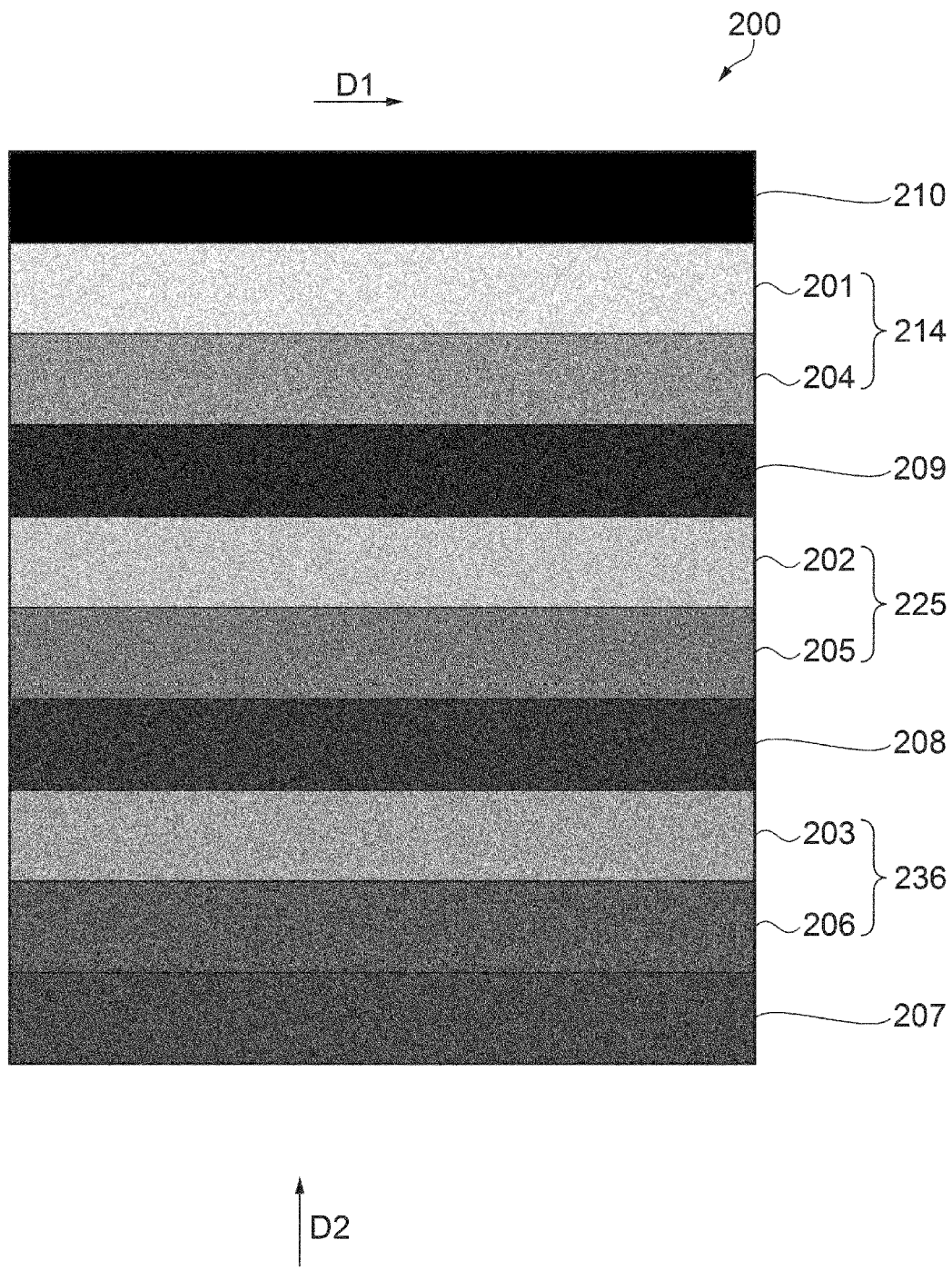
FIG. 9 is a diagram illustrating a test pattern in Modification Example 1.

FIG. 9 is a diagram illustrating a test pattern in Modification Example 1. In a TP 200, ten patches 201 to 210 each having a length equal to that of the nozzle row 26 in the direction D1 and an equal length in the direction D2 are arrayed along the direction D2. The TP 200 is formed of a plurality of first patches 214, 225, and 236 in a first concentration range in which recording on the recording medium 30 is performed with an ink amount that exceeds 0% but does not exceed 60% and a plurality of second patches 207 to 210 in a second concentration range with an ink amount that exceeds 60% but does not exceed 100%. Further, the first patch 214 includes a plurality of first sub-patches 201 and 204 having different degrees of concentration in the first concentration range. The first patch 225 includes a plurality of first sub-patches 202 and 205 having different degrees of concentration in the first concentration range. The first patch 236 includes a plurality of first sub-patches 203 and 206 having different degrees of concentration in the first concentration range.

Specifically, the first sub-patch 201 is a patch recorded with an ink amount of 10%. The first sub-patch 202 is a patch recorded with an ink amount of 20%. The first sub-patch 203 is a patch recorded with an ink amount of 30%. The first sub-patch 204 is a patch recorded with an ink amount of 40%. The first sub-patch 205 is a patch recorded with an ink amount of 50%. The first sub-patch 206 is a patch recorded with an ink amount of 60%.

Therefore, the average ink amount of the first patch 214 is 25%, the average ink amount of the first patch 225 is 35%, and the average ink amount of the first patch 236 is 45%.

The second patch 207 is a patch recorded with an ink amount of 70%. The second patch 208 is a patch recorded with an ink amount of 80%. The second patch 209 is a patch recorded with an ink amount of 90%. The second patch 210 is a patch recorded with an ink amount of 100%.

The first patch 214, 225, and 236 are arranged concentration is higher, that is, the ink amount is increased from one side being a tip end of an arrow indicating the direction D2 to the other side being a base end of the arrow.

The second patches 207 to 210 are arranged concentration is higher, that is, the ink amount is increased from the other side being the base end of the arrow indicating the direction D2 to the one side being the top end of the arrow.

Further, the first patch 214, 225, and 236 and the second patches 207 to 210 are arranged alternately to each other in the direction D2.

According to the correction value setting method using the TP 200, in the TP 200 recorded on the recording medium 30, the ink amount in the region formed of the three patches the first patch 214 including the first sub-patches 201 and 204 and the second patch 210 is less than the ink amount in the region formed of the three patches including the second patches 210, 209, and 208 that are arranged continuously in a TP in which arrangement is made to have the ink amounts that are sequentially reduced, for example. Thus, paper wrinkles are less likely to be formed on the recording medium 30. With this, reading accuracy of the TP 200 recorded on the recording medium 30 can be improved, and an appropriate correction value can be calculated.

2-2. Modification Example 2

Figure 10:
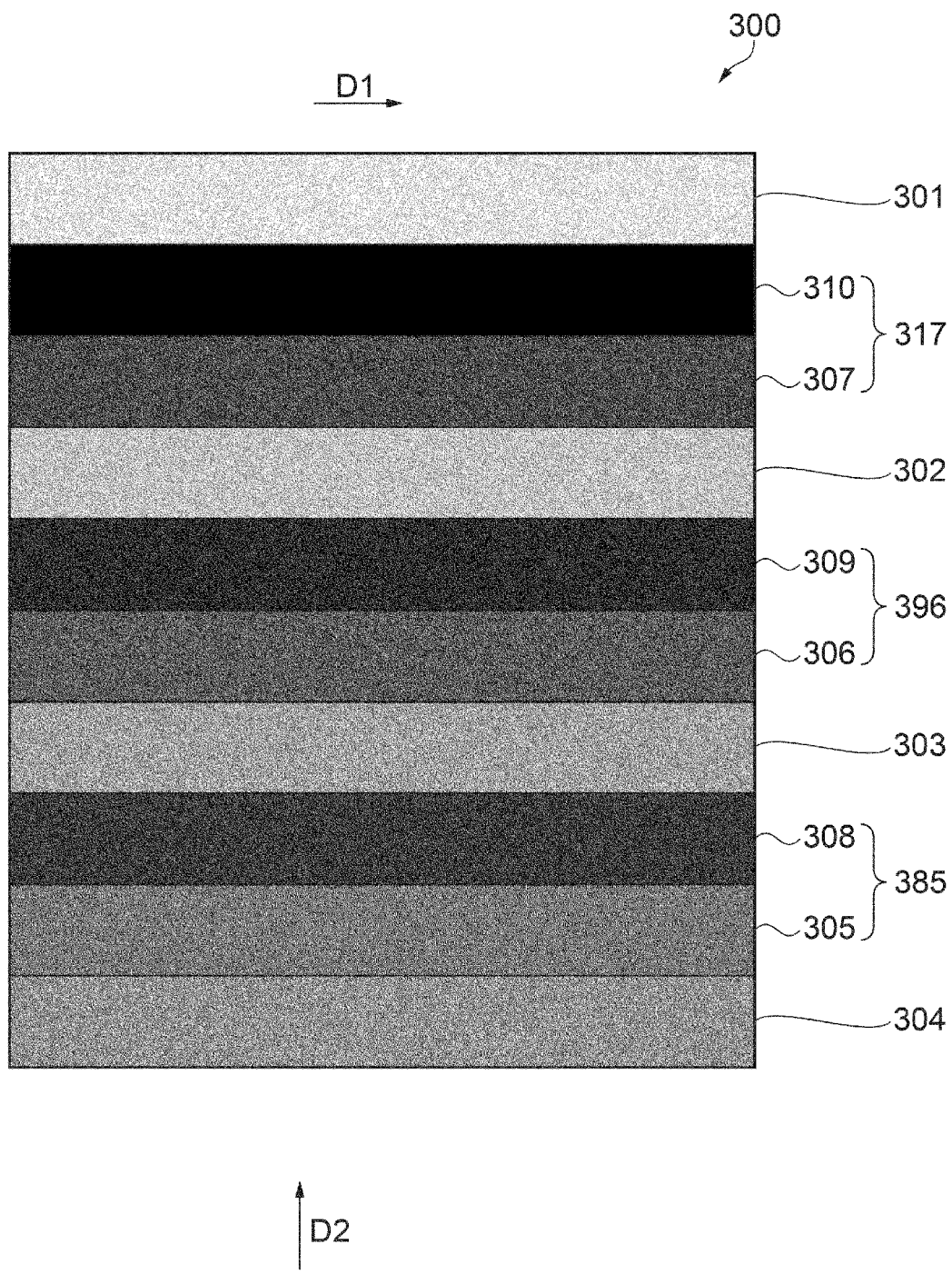
FIG. 10 is a diagram illustrating a test pattern in Modification Example 2.

FIG. 10 is a diagram illustrating a test pattern in Modification Example 2. In a TP 300, ten patches 301 to 310 each having a length equal to that of the nozzle row 26 in the direction D1 and an equal length in the direction D2 are arrayed along the direction D2. The TP 300 is formed of a plurality of first patches 301 to 304 in a first concentration range in which recording on the recording medium 30 is performed with an ink amount that exceeds 0% but does not exceed 40% and a plurality of second patches 317, 396, and 385 in a second concentration range with an ink amount that exceeds 40% but does not exceed 100%. Further, the second patch 317 includes a plurality of second sub-patches 310 and 307 having different degrees of concentration in the second concentration range. The second patch 396 includes a plurality of second sub-patches 309 and 306 having different degrees of concentration in the second concentration range. The second patch 385 includes a plurality of second sub-patches 308 and 305 having different degrees of concentration in the second concentration range.

Specifically, the first patch 301 is a patch recorded with an ink amount of 10%. The first patch 302 is a patch recorded with an ink amount of 20%. The first patch 303 is a patch recorded with an ink amount of 30%. The first patch 304 is a patch recorded with an ink amount of 40%.

The second sub-patch 305 is a patch recorded with an ink amount of 50%. The second sub-patch 306 is a patch recorded with an ink amount of 60%. The second sub-patch 307 is a patch recorded with an ink amount of 70%. The second sub-patch 308 is a patch recorded with an ink amount of 80%. The second sub-patch 309 is a patch recorded with an ink amount of 90%. The second sub-patch 310 is a patch recorded with an ink amount of 100%.

Therefore, the average ink amount of the second patch 317 is 85%, the average ink amount of the second patch 396 is 75%, and the average ink amount of the second patch 385 is 65%.

The first patches 301 to 304 are arranged concentration is higher, that is, the ink amount is increased from one side being a tip end of an arrow indicating the direction D2 to the other side being a base end of the arrow.

The second patches 317, 396, and 385 are arranged concentration is higher, that is, the ink amount is increased from the other side being the base end of the arrow indicating the direction D2 to the one side being the top end of the arrow.

Further, the first patches 301 to 304 and the second patches 317, 396, and 385 are arranged alternately to each other in the direction D2.

According to the correction value setting method using the TP 300, in the TP 300 recorded on the recording medium 30, the ink amount in the region formed of the three patches including the first patch 301 and the second patch 317 including the second sub-patches 310 and 307 is less than the ink amount in the region formed of three patches in which a patch with an ink amount of 100%, a patch with an ink amount of 90%, and a patch with an ink amount of 80% that are arranged continuously in the related-art TP in which arrangement is made to have the ink amounts that are sequentially reduced, for example. Thus, paper wrinkles are less likely to be formed on the recording medium 30. With this, reading accuracy of the TP 300 recorded on the recording medium 30 can be improved, and an appropriate correction value can be calculated.

2-3. Modification Example 3

Figure 11:
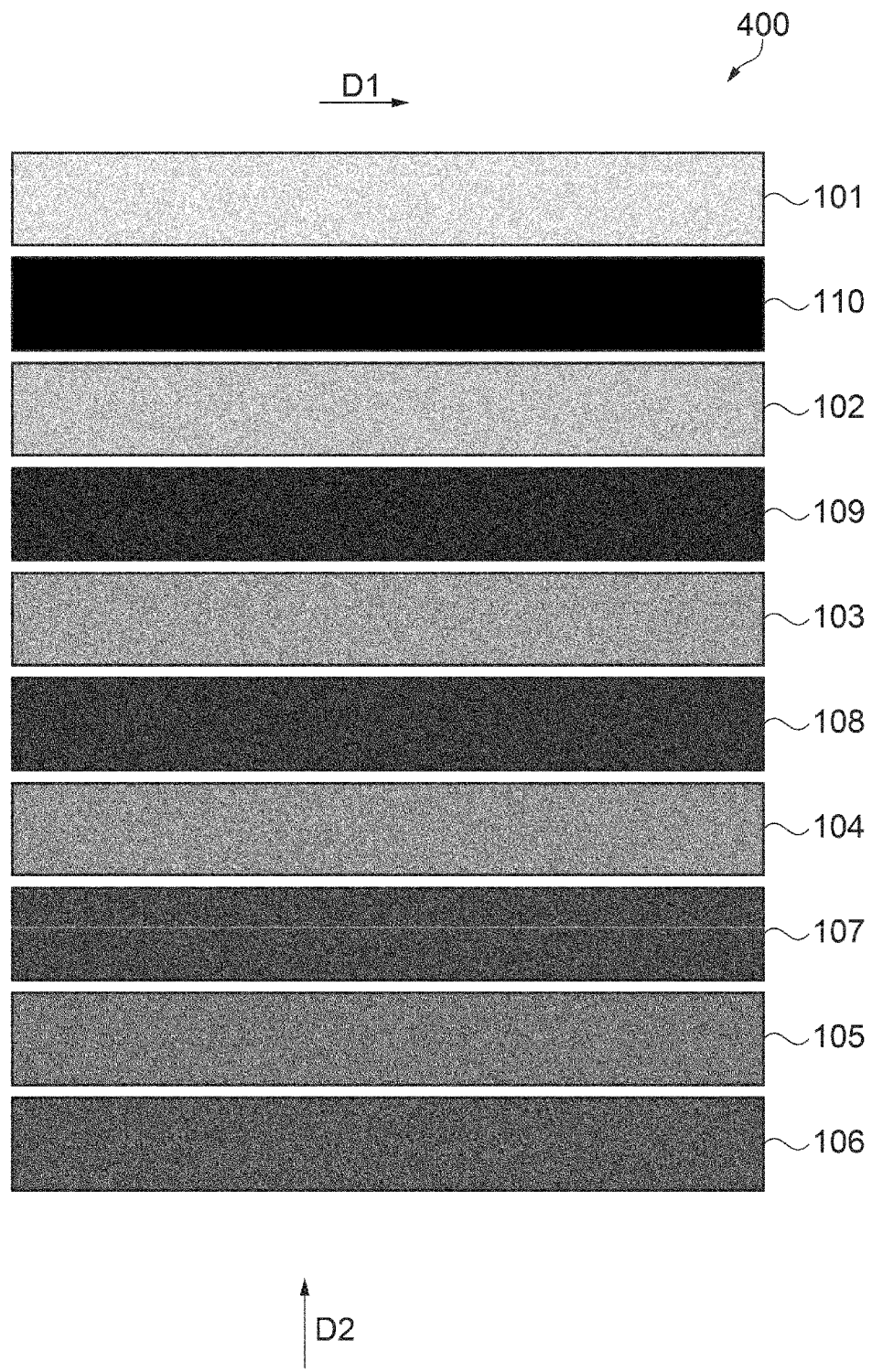
FIG. 11 is a diagram illustrating a test pattern in Modification Example 3.

FIG. 11 is a diagram illustrating a test pattern in Modification Example 3. A TP 400 includes the plurality of patches 101 to 110 similarly to the TP 100 described in the exemplary embodiment. The patches 101 to 110 includes the plurality of first patches 101 to 105 in the first concentration range and the plurality of second patches 106 to 110 in the second concentration range similarly to the exemplary embodiment, and are arranged similarly to the exemplary embodiment. However, in this modification example, the plurality of first patches 101 to 105 and the plurality of second patches 106 to 110 are arranged away from each other.

The TP 400 recorded on the recording medium 30 does not have a boundary between the patches where the ink easily blots. Thus, with the correction value setting method using the TP 400, reading accuracy of each of the patches 101 to 110 is improved, and an appropriate correction value can be calculated.

2-4. Modification Example 4

Figure 12:
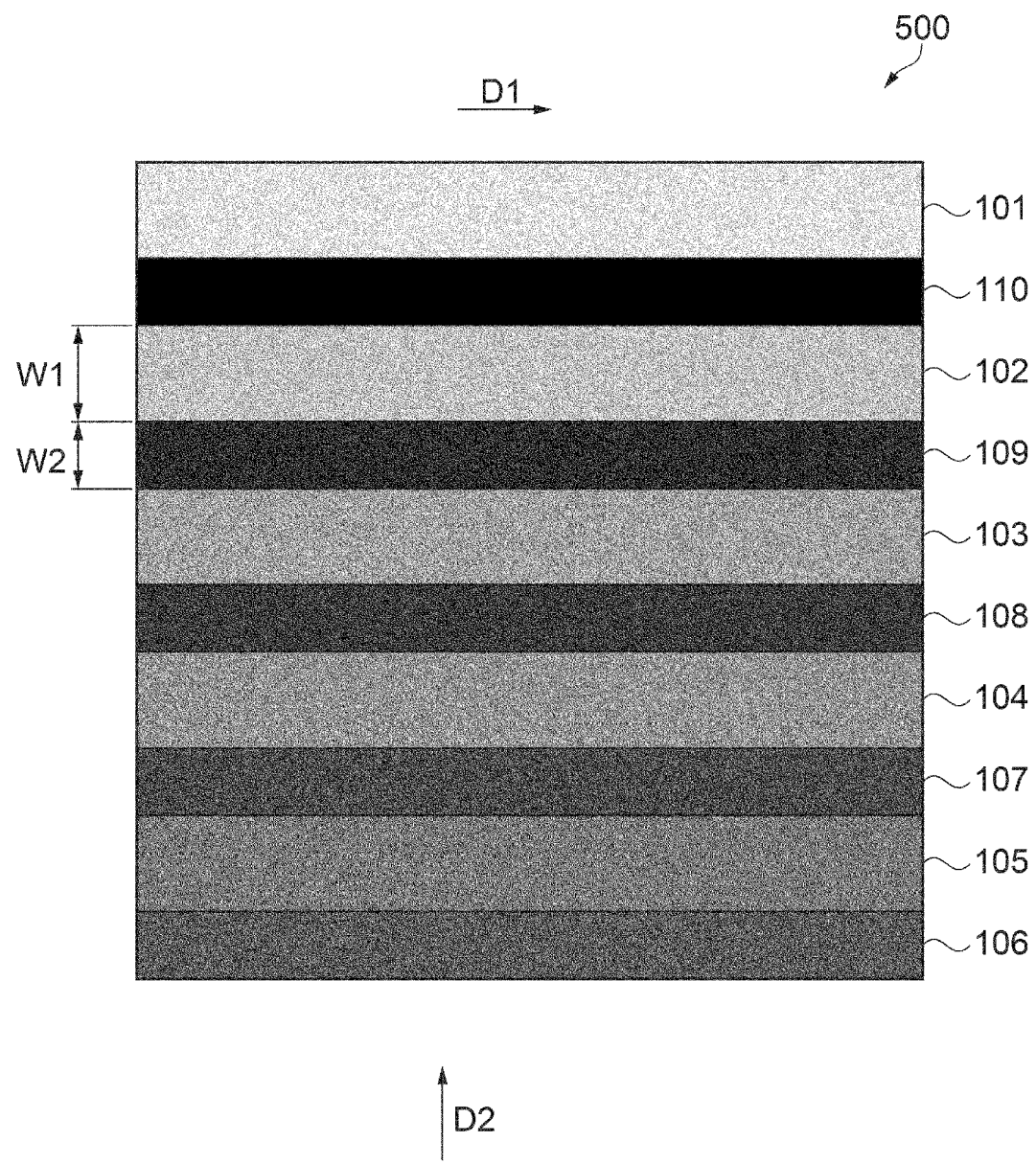
FIG. 12 is a diagram illustrating a test pattern in Modification Example 4.

FIG. 12 is a diagram illustrating a test pattern in Modification Example 4. A TP 500 includes the plurality of patches 101 to 110 similarly to the TP 100 described in the exemplary embodiment. The patches 101 to 110 includes the plurality of first patches 101 to 105 in the first concentration range and the plurality of second patches 106 to 110 in the second concentration range similarly to the exemplary embodiment, and are arranged similarly to the exemplary embodiment. However, in this modification example, a width W2 of each of the second patches 106 to 110 in the direction D2 is smaller than a width W1 of each of the first patches 101 to 105 in the direction D2.

According to the correction value setting method using the TP 500, in the TP 500, the width W2 of the second patch with the large ink amount is smaller than the width W1 of the first patch with the small ink amount at the time of recording on the recording medium 30. Thus, the total ink amount for recording the TP 500 is reduced, and paper wrinkles are less likely to be formed on the recording medium 30. With this, reading accuracy of the TP 500 recorded on the recording medium 30 can be improved, and an appropriate correction value can be calculated.

Contents derived from the exemplary embodiments will be described below.

A correction value setting method includes recording a test pattern including a plurality of patches on a recording medium with a plurality of nozzles arrayed in a first direction, reading a concentration value of the test pattern recorded on the recording medium, calculating a correction value of an ink amount for each of the plurality of nozzles, based on the concentration value, and setting the correction value to a correction value that is used for real recording, wherein the plurality of patches include a plurality of first patches in a first concentration range and a plurality of second patches in a second concentration range with concentration higher than concentration of the first concentration range, and the plurality of first patches and the plurality of second patches are arranged alternately in a second direction intersecting the first direction.

According to this method, the first patches in the first concentration range and the second patches in the second concentration range having concentration higher than the first concentration range are arranged alternately in the second direction intersecting the first direction. When the test pattern is recorded on the recording medium, the patch with higher concentration is recorded with a larger ink amount. In the test pattern recorded on the recording medium, the ink amount in the region formed by the two patches including the first patch and the second path that are adjacent to each other is less than the ink amount in the region formed by the two second patches being the second patches arranged continuously. Thus, paper wrinkles are less likely to be formed on the recording medium. With this, reading accuracy for the test pattern can be improved, and an appropriate correction value can be calculated.

In the correction value setting method described above, the plurality of first patches each may include a plurality of first sub-patches having different degrees of concentration in the first concentration range.

According to this method, in the test pattern recorded on the recording medium, the ink amount in the region formed of the two patches including the first patch including the plurality of first sub-patches and the second patch is smaller than the ink amount in the region formed of the three second patches being the second patches that are arranged continuously. Thus, paper wrinkles are less likely to be formed on the recording medium. With this, reading accuracy for the test pattern can be improved, and an appropriate correction value can be calculated.

In the correction value setting method described above, the plurality of second patches each may include a plurality of second sub-patches having different degrees of concentration in the second concentration range.

According to this method, in the test pattern recorded on the recording medium, the ink amount in the region formed of the two patches including the first patch and the second patch including the plurality of second sub-patches is smaller than the ink amount in the region formed of the two second patches being the second patches that are arranged continuously. Thus, paper wrinkles are less likely to be formed on the recording medium. With this, reading accuracy for the test pattern can be improved, and an appropriate correction value can be calculated.

In the correction value setting method described above, the plurality of first patches may be arranged with increased concentration as approaching another side from one side of the second direction, and the plurality of second patches may be arranged with increased concentration as approaching the one side from the another side of the second direction.

According to this method, in the test pattern, the first patch with the highest concentration in the first concentration range and the second patch with the lowest concentration in the second concentration range are arranged adjacent to each other. Further, the first patch with the lowest concentration in the first concentration range and the second patch with the highest concentration in the second concentration range are arranged adjacent to each other. With this, the ink amount distribution on the test pattern recorded on the recording medium is leveled, and paper wrinkles are less likely to be formed on the recording medium. Thus, reading accuracy for the test pattern can be improved, and an appropriate correction value can be calculated.

In the correction value setting method described above, during the reading, an inner side in a region with the same concentration of the plurality of patches in the second direction may be read.

According to this method, the inner sides in the same concentration region except for the patch boundaries at which the ink easily blots are read, and hence accuracy of reading each of the patches can be improved.

In the correction value setting method described above, the plurality of first patches and the plurality of second patches may be away from each other.

According to this method, the first patches and the second patches are away from each other. In other words, the patch boundaries at which the ink easily blots are not present, and hence accuracy of reading each of the patches can be improved.

In the correction value setting method described above, a width of the plurality of second patches in the second direction may be smaller than a width of the plurality of first patches in the second direction.

According to this method, the width of the second patch in the high concentration range is smaller than the width of the first patch in the low concentration range. Thus, the total ink amount for recording the TP is reduced, and paper wrinkles are less likely to be formed on the recording medium. With this, reading accuracy for the test pattern recorded on the recording medium can be improved, and an appropriate correction value can be calculated.

A recording method includes setting a correction value by executing the correction value setting method described above, generating recording data for performing real recording, and performing the real recording on a recording medium with a plurality of nozzles.

According to this method, when the correction value setting method is executed, an appropriate correction value is calculated in the step for setting the correction value, and hence the recording method that improves recording quality can be provided.

A recording device includes a correction value setting unit configured to set a correction value by executing the correction value setting method described above, a real recording data generation unit configured to generate recording data for performing real recording, and a recording unit configured to perform the real recording on a recording medium with a plurality of nozzles.

According to this configuration, the correction value setting unit executes the correction value setting method, and calculation of the correction value and generation of the recording data are appropriately performed. Thus, the recording device that improves recording quality can be provided.

What is claimed is:

1. A correction value setting method, comprising:
a recording step of recording on a recording medium a test pattern including a plurality of patches by a plurality of nozzles arrayed in a first direction;
a reading step of reading a concentration value of the test pattern recorded on the recording medium;
a calculating step of calculating a correction value of an ink amount for each of the plurality of nozzles, based on the concentration value; and
a setting step of setting the correction value to a correction value that is used for real recording, wherein
the plurality of patches include a plurality of first patches in a first concentration range and a plurality of second patches in a second concentration range including concentration higher than that of the first concentration range, and
the plurality of first patches and the plurality of second patches are arranged alternately in a second direction intersecting the first direction.

2. The correction value setting method according to claim 1, wherein
each of the first patches includes a plurality of first sub-patches having different degrees of concentration in the first concentration range.

3. The correction value setting method according to claim 1, wherein
each of the second patches includes a plurality of second sub-patches having different degrees of concentration in the second concentration range.

4. The correction value setting method according to claim 1, wherein
the plurality of first patches are arranged such that concentration thereof gradually increases from one side to another side in the second direction, and
the plurality of second patches are arranged such that concentration thereof gradually increases from another side to the one side in the second direction.

5. The correction value setting method according to claim 1, wherein
in the reading step, an inner side in a region having a same concentration of each of the patches in the second direction is read.

6. The correction value setting method according to claim 1, wherein
the plurality of first patches and the plurality of second patches are separated away from one another.

7. The correction value setting method according to claim 1, wherein
a width of each of the second patches in the second direction is smaller than a width of each of the first patches in the second direction.

8. A recording method, comprising:
a step of setting a correction value by executing the correction value setting method according to claim 1;
a real recording data generating step of generating recording data for performing real recording; and
a real recording step of performing real recording on a recording medium by a plurality of nozzles.

9. A recording device, comprising:
a correction value setting unit configured to set a correction value by executing the correction value setting method according to claim 1;
a real recording data generation unit configured to generate recording data for performing real recording; and
a recording unit configured to perform real recording on a recording medium by a plurality of nozzles.

* * * * *